(12) United States Patent
Sugawara

(10) Patent No.: US 11,880,127 B2
(45) Date of Patent: Jan. 23, 2024

(54) LENS DRIVING APPARATUS, CAMERA MODULE, AND CAMERA-MOUNTED APPARATUS

(71) Applicant: Masayoshi Sugawara, Tokyo (JP)

(72) Inventor: Masayoshi Sugawara, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 17/783,277

(22) PCT Filed: Oct. 30, 2020

(86) PCT No.: PCT/JP2020/040867
§ 371 (c)(1),
(2) Date: Jun. 8, 2022

(87) PCT Pub. No.: WO2021/117374
PCT Pub. Date: Jun. 17, 2021

(65) Prior Publication Data
US 2023/0016060 A1 Jan. 19, 2023

(30) Foreign Application Priority Data

Dec. 12, 2019 (JP) .................................. 2019-224591

(51) Int. Cl.
G03B 5/00 (2021.01)
H04N 23/55 (2023.01)
G03B 13/36 (2021.01)
H02N 2/02 (2006.01)

(52) U.S. Cl.
CPC ............... *G03B 5/00* (2013.01); *G03B 13/36* (2013.01); *H04N 23/55* (2023.01); *G03B 2205/0015* (2013.01); *G03B 2205/0084* (2013.01); *H02N 2/02* (2013.01)

(58) Field of Classification Search
CPC .. G03B 5/00; G03B 13/36; G03B 2205/0015; G03B 2205/0084; H04N 5/2254; H02N 2/02
See application file for complete search history.

(56) References Cited

U.S. PATENT DOCUMENTS

| 2008/0170307 A1 | 7/2008 | Campbell et al. |
| 2009/0268319 A1 | 10/2009 | Woo |
| 2011/0141584 A1 | 6/2011 | Henderson et al. |

(Continued)

FOREIGN PATENT DOCUMENTS

| CN | 110456474 | 11/2019 |
| JP | 3154894 | 10/2009 |

(Continued)

*Primary Examiner* — Stephone B Allen
*Assistant Examiner* — Tamara Y. Washington

(57) ABSTRACT

A lens drive device is provided with: a lens holder for holding a lens; an ultrasonic motor configured to move the lens holder in a direction of an optical axis; and a support part configured to support the lens holder in a state where the lens holder is urged in a direction orthogonal to the optical axis and such that the lens holder is capable of moving in the direction of the optical axis. The support part includes two pairs of support portions which are disposed respectively on two straight lines along an urging direction and parallel to each other such that the support portions of each pair holds the lend holder therebetween.

7 Claims, 14 Drawing Sheets

(56) References Cited

U.S. PATENT DOCUMENTS

| | | | |
|---|---|---|---|
| 2015/0162853 A1* | 6/2015 | Leroy | .................... H02N 2/103 |
| | | | 310/323.02 |
| 2016/0299349 A1* | 10/2016 | Cho | ........................ G03B 3/10 |
| 2017/0052386 A1 | 2/2017 | Siegrist et al. | |
| 2017/0108660 A1 | 4/2017 | Kuo | |

FOREIGN PATENT DOCUMENTS

| | | |
|---|---|---|
| JP | 2010-176073 | 8/2010 |
| JP | 2013-513821 | 4/2013 |
| JP | 2013-190556 | 9/2013 |
| JP | 2013-210550 | 10/2013 |
| JP | 2015-141389 | 8/2015 |
| JP | 2017-506366 | 3/2017 |
| JP | 2017-076020 | 4/2017 |
| KR | 10-2009-0112319 | 10/2009 |
| WO | WO 2013/172001 | 11/2013 |
| WO | WO 2015/123787 | 8/2015 |

\* cited by examiner

LENS DRIVING APPARATUS, CAMERA MODULE, AND CAMERA-MOUNTED APPARATUS

RELATED APPLICATIONS

This application is a National Phase of PCT Patent Application No. PCT/JP2020/040867 having International filing date of Oct. 30, 2020, which claims the benefit of priority of Japanese Patent Application No. 2019-224591 filed on Dec. 12, 2019. The contents of the above applications are all incorporated herein by reference.

TECHNICAL FIELD

The present invention relates to a lens driving apparatus, a camera module, and a camera-mounted apparatus.

BACKGROUND ART

In general, a small-sized camera module is mounted in a mobile terminal such as a smartphone. To such a camera module, a lens driving apparatus is applied which has an auto-focusing function (hereinafter referred to as "AF (Auto Focus) function") of automatically performing focusing when a subject is photographed, and a shake-correcting function (hereinafter referred to as "OIS (Optical Image Stabilization) function") of reducing irregularities of an image by optically correcting shake (vibration) generated during photographing (for example, Patent Literature (hereinafter referred to as "PTL") 1).

The lens driving apparatus having the AF function and the OIS function includes: an auto-focusing driving part (hereinafter referred to as "AF driving part") for moving a lens part in a direction of an optical axis; and a shake-correcting driving part (hereinafter referred to as "OIS driving part") for swaying the lens part within a plane orthogonal to the direction of the optical axis. In PTL 1, a voice coil motor (VCM) is applied to the AF driving part and the OIS driving part.

Further, in recent years, a camera module including a plurality of (typically two) lens driving apparatuses has been put into practical use (so-called dual camera). The dual camera has various possibilities depending on the use scenes, such as two images having different focal lengths can be simultaneously captured, a still image and a moving image can be simultaneously captured, and the like.

CITATION LIST

Patent Literature

PTL 1
Japanese Patent Application Laid-Open No. 2013-210550
PTL 2
WO 2015/123787

SUMMARY OF INVENTION

Technical Problem

However, the lens driving apparatus utilizing the VCM as in PTL 1 is subjected to the impact of external magnetism and therefore a highly accurate operation may be impaired. In particular, in a dual camera in which lens driving apparatuses are juxtaposed, it is highly likely that magnetic interference will occur between the lens driving apparatuses. PTL 2, on the other hand, discloses a lens driving apparatus in which an ultrasonic motor is applied to an AF driving part and an OIS driving part. The lens driving apparatus disclosed in PTL 2 is magnetless and is therefore capable of reducing the impact of external magnetism, but has a complicated structure and has difficulty in achieving miniaturization and a reduction in height.

An object of the present invention is to provide a lens driving apparatus, a camera module, and a camera-mounted apparatus each capable of achieving miniaturization and a reduction in height and improving driving performance.

Solution to Problem

A lens driving apparatus according to the present invention includes:
  a first fixing part;
  a first movable part disposed radially inward from the first fixing part;
  a first support part that supports the first movable part with respect to the first fixing part; and
  a Z-direction driving part that is disposed in the first fixing part and moves the first movable part in a direction of an optical axis with respect to the first fixing part. The lens driving apparatus has a shape of a rectangle in plan view when viewed in the direction of the optical axis. The first movable part includes a power transmission part that is disposed so as to protrude radially outward. The Z-direction driving part is formed of an ultrasonic motor that converts vibration motion into linear motion, and the Z-direction driving part is disposed on a first side of the rectangle so as to abut on the power transmission part. The first movable part is supported, via the first support part, by the first fixing part in a state in which the first movable part is urged in an urging direction orthogonal to the direction of the optical axis.

A camera module according to the present invention includes:
  the lens driving apparatus described above;
  a lens part that is attached to the first movable part; and
  an image-capturing part that captures a subject image formed by the lens part.

A camera-mounted apparatus according to the present invention is an information apparatus or a transport apparatus, and includes:
  the camera module described above; and
  an image-processing part that processes image information obtained by the camera module.

Advantageous Effects of Invention

According to the present invention, it is possible to achieve miniaturization and a reduction in height for a lens driving apparatus, a camera module, and a camera-mounted apparatus and to improve driving performance thereof.

DESCRIPTION OF EMBODIMENTS

Hereinafter, a preferred embodiment of the present invention will be described in detail with reference to the accompanying drawings.

Figure 1A:
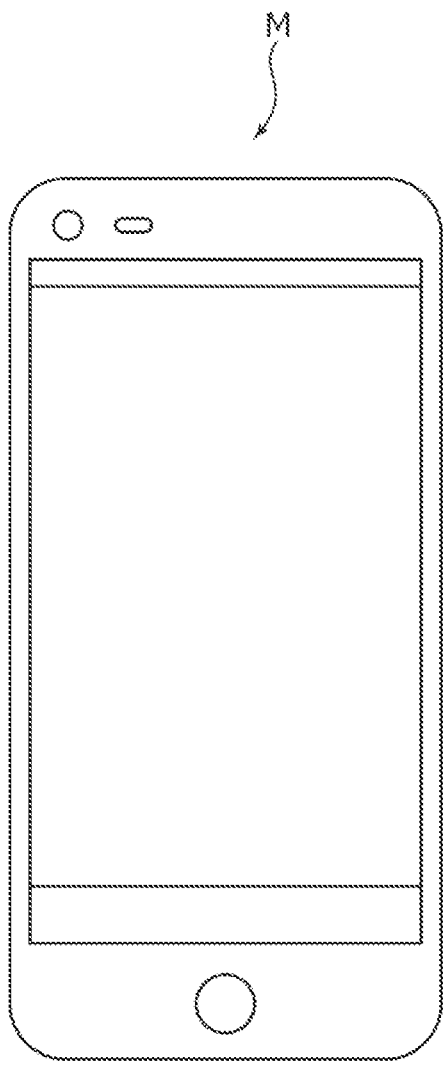
FIGS. 1A and 1B illustrate a smartphone in which a camera module is mounted according to an embodiment of the present invention.
Figure 1B:
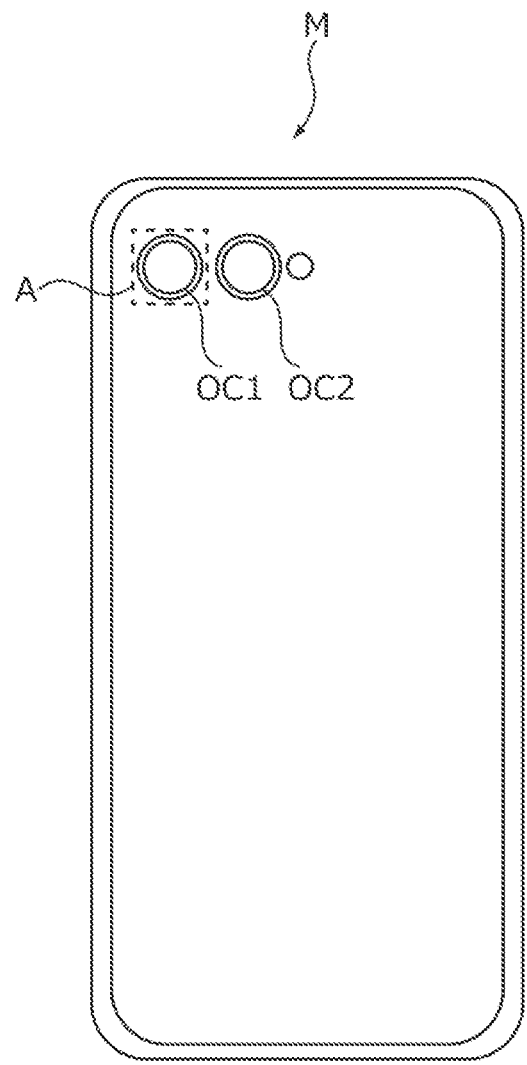

FIGS. 1A and 1B illustrate smartphone M (an example of the camera-mounted apparatus) in which camera module A is mounted according to an embodiment of the present invention. FIG. 1A is a front view of smartphone M, and FIG. 1B is a rear view of smartphone M.

Smartphone M includes a dual camera with two rear cameras OC1 and OC2. In the present embodiment, camera module A is applied to rear cameras OC1 and OC2.

Camera module A has the AF function and the OIS function, and is capable of photographing an image without image blurring by automatically performing focusing when a subject is photographed and by optically correcting shake (vibration) generated during photographing.

Figure 2:
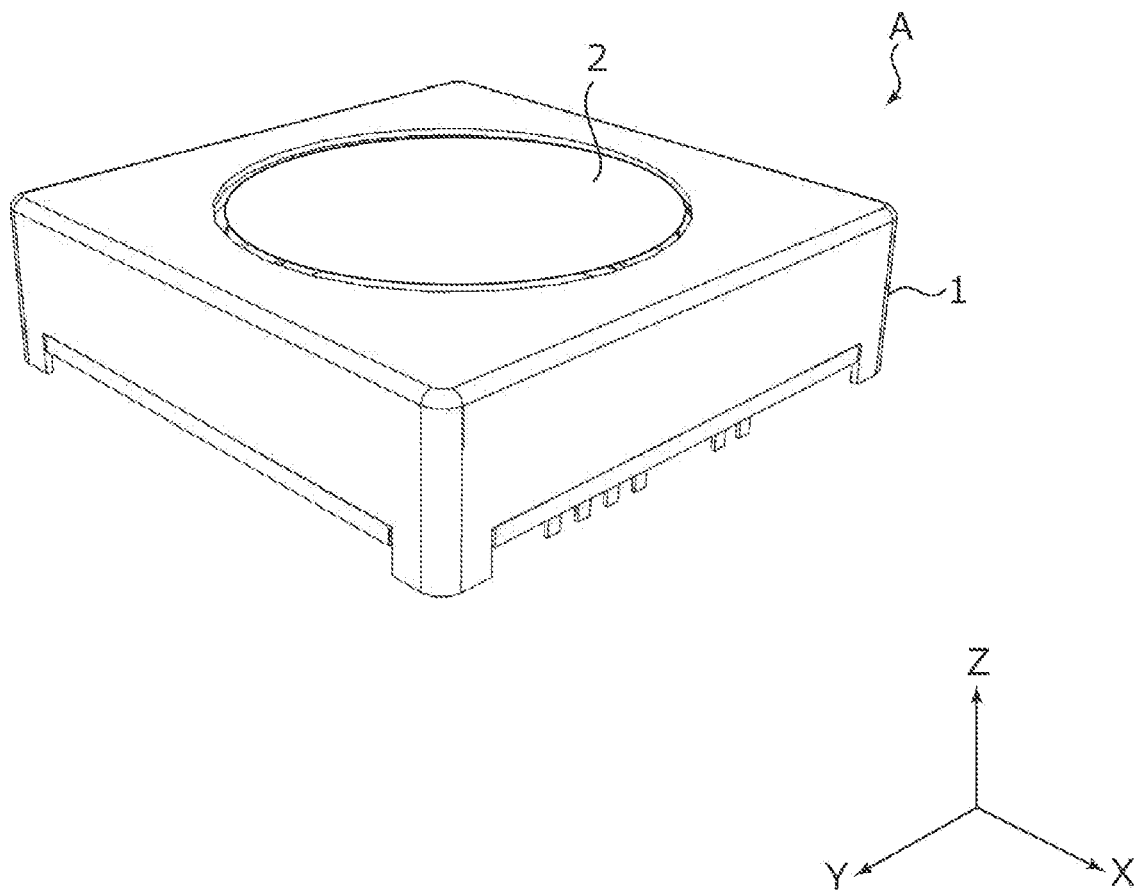
FIG. 2 is an external perspective view of the camera module.
Figure 3A:
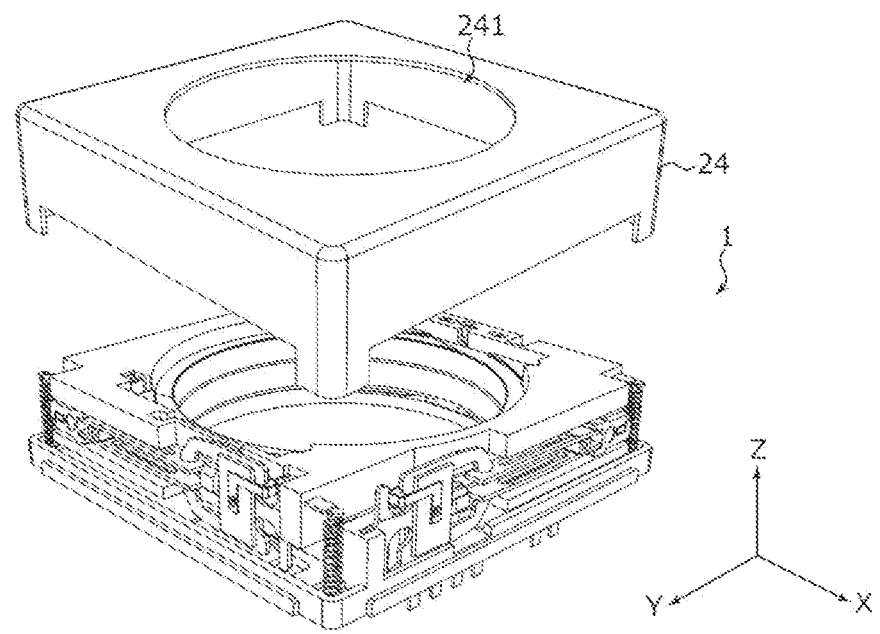
FIGS. 3A and 3B are external perspective views of a lens driving apparatus according to the embodiment.
Figure 3B:
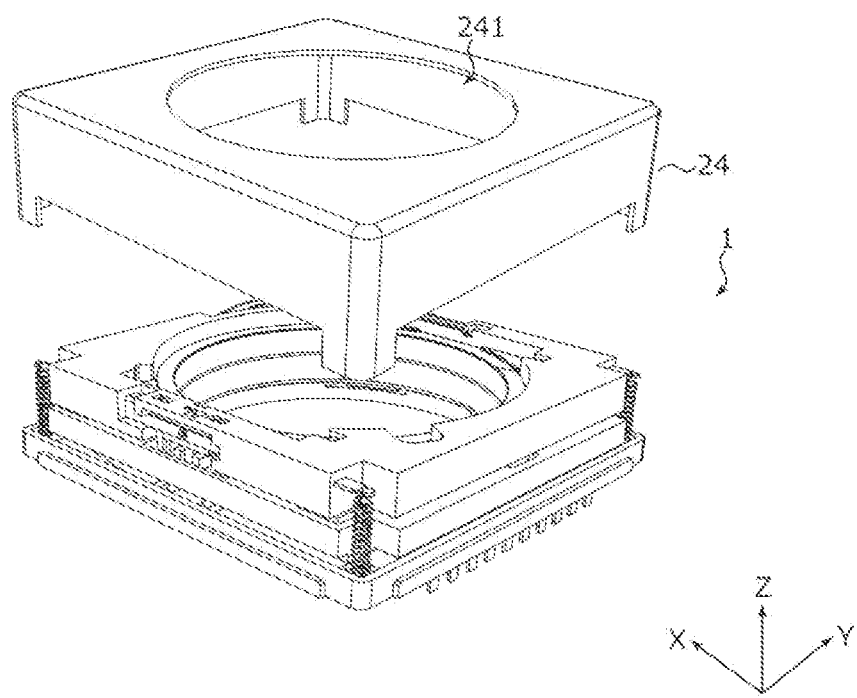

FIG. 2 is an external perspective view of camera module A. FIGS. 3A and 3B are external perspective views of lens driving apparatus 1 according to the embodiment. FIG. 3B illustrates a state in which FIG. 3A is rotated by 180O around the Z axis. As illustrated in FIGS. 2, 3A and 3B, a description will be given using an orthogonal coordinate system (X, Y, Z) in the embodiment. The same orthogonal coordinate system (X, Y, Z) is also used in the drawings to be described later.

Camera module A is mounted such that the X direction is an up-down direction (or a left-right direction), the Y direction is a left-right direction (or an up-down direction), and the Z direction is a front-rear direction in a case where photographing is actually performed with smartphone M, for example. That is, the Z direction is a direction of an optical axis (hereinafter, may also be referred to as "optical axis direction"), the upper side (+Z side) in the drawings is a light reception side in the optical axis direction, and the lower side (−Z side) in the drawings is an image formation side in the optical axis direction. Further, the X direction and the Y direction that are orthogonal to the Z axis will be each referred to as "optical axis-orthogonal direction" and the XY plane will be referred to as "optical axis-orthogonal plane".

As illustrated in FIGS. 2, 3A and 3B, camera module A includes: lens driving apparatus 1 that realizes the AF function and the OIS function; lens part 2 in which a lens is housed in a lens barrel having a cylindrical shape; and an image-capturing part (not illustrated) that captures a subject image formed by lens part 2, and the like.

The image-capturing part (not illustrated) is disposed on the image formation side in the optical axis direction of lens driving apparatus 1. The image-capturing part (not illustrated) includes, for example, an image sensor board, and an imaging element that is mounted in the image sensor board. The imaging element is formed of, for example, a charge-coupled device (CCD) image sensor, a complementary metal oxide semiconductor (CMOS) image sensor, or the like. The imaging element captures a subject image formed by lens part 2. Lens driving apparatus 1 is mounted in the image sensor board (not illustrated) and is mechanically and electrically connected to the image sensor board. A control part that controls the driving of lens driving apparatus 1 may be provided in the image sensor board or may be provided in a camera-mounted apparatus (smartphone M in the embodiment) in which camera module A is mounted.

The outside of lens driving apparatus 1 is covered with cover 24. Cover 24 is a capped square cylindrical body having a rectangular shape in plan view when viewed in the optical axis direction. In the embodiment, cover 24 has a square shape in plan view. Cover 24 includes opening 241 in the upper surface. Opening 241 has a substantially circular shape. Lens part 2 is configured to face the outside through opening 241 of cover 24, and to protrude to the light reception side from an opening surface of cover 24 in accordance with movement in the optical axis direction. Cover 24 is fixed to base 21 (see FIG. 4) of OIS fixing part 20 of lens driving apparatus 1 by, for example, adhesion.

Figure 4:
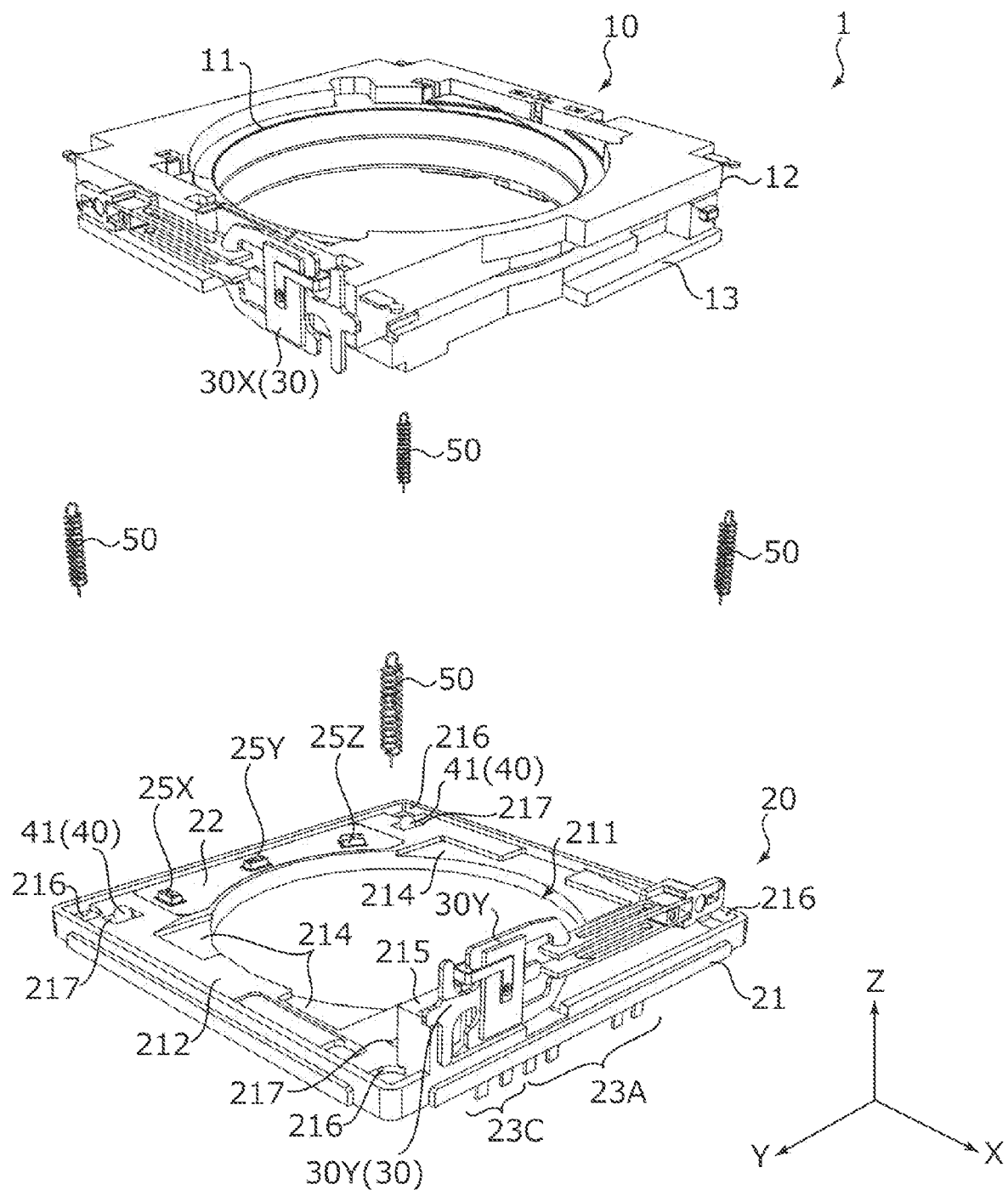
FIG. 4 is an exploded perspective view of the lens driving apparatus.
Figure 5:
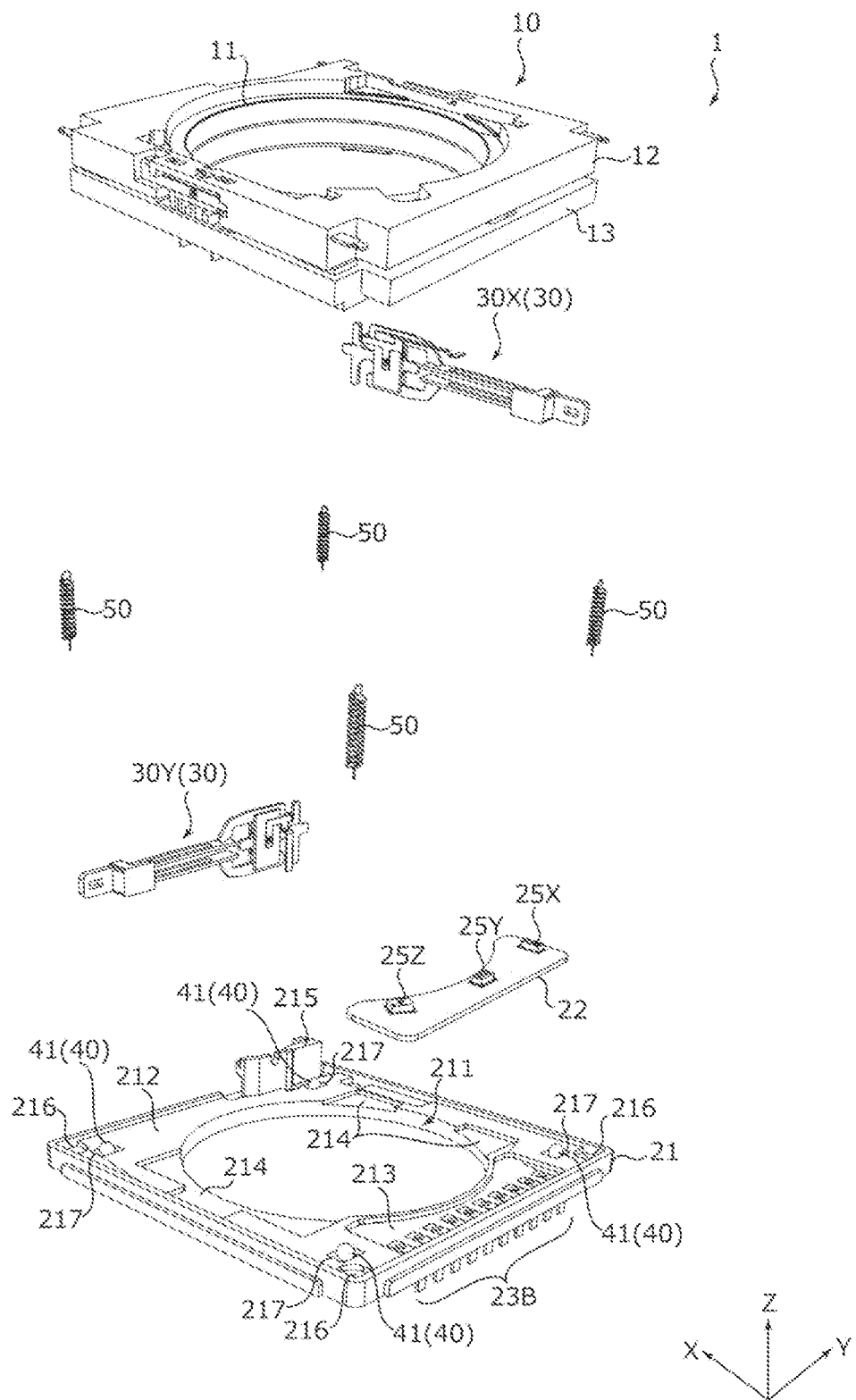
FIG. 5 is an exploded perspective view of the lens driving apparatus.

FIGS. 4 and 5 are exploded perspective views of lens driving apparatus 1. FIG. 5 illustrates a state in which FIG. 4 is rotated by 180O around the Z axis. FIG. 4 illustrates a state in which OIS driving part 30 and sensor board 22 are attached, and FIG. 5 illustrates a state in which OIS driving part 30 and sensor board 22 are detached.

As illustrated in FIGS. 4 and 5, lens driving apparatus 1 includes OIS movable part 10 (second movable part), OIS fixing part 20 (second fixing part), OIS driving part 30 (XY-direction driving part), and OIS support part 40 (second support part) in the present embodiment.

OIS movable part 10 is a portion that sways within the optical axis-orthogonal plane during shake correction. OIS movable part 10 includes an AF unit, second stage 13, and balls 42 (see FIG. 8 or the like). The AF unit includes AF movable part 11 (first movable part), first stage 12 (first fixing part), AF driving part 14 (Z-direction driving part), and AF support part 15 (first support part) (see FIGS. 7A to 9).

OIS fixing part 20 is a portion to which OIS movable part 10 is connected via OIS support part 40. OIS fixing part 20 includes base 21.

OIS movable part 10 is disposed so as to be separated from OIS fixing part 20 in the optical axis direction, and is coupled to OIS fixing part 20 via OIS support part 40. Further, OIS movable part 10 and OIS fixing part 20 are urged in mutually approaching directions by OIS urging members 50. In the present embodiment, OIS urging members 50 are provided at four corners of lens driving apparatus 1 in plan view.

Note that, in the present embodiment, OIS movable part 10 in its entirety, including the AF unit, moves as a movable body with respect to the movement in the Y direction. With respect to the movement in the X direction, on the other hand, only the AF unit moves as a movable body. That is, with respect to the movement in the X direction, second stage 13 and base 21 form OIS fixing part 20, and ball 42 functions as OIS support part 40.

Base 21 is formed of, for example, a molding material made of polyarylate (PAR), a PAR alloy (for example, PAR/PC) obtained by mixing a plurality of resin materials including PAR, or a liquid crystal polymer. Base 21 is a member having a rectangular shape in plan view, and includes opening 211 in the center. Opening 211 has a circular shape.

Base 21 includes first base part 212, which forms a main surface of base 21, and second base part 213, in which sensor board 22 is disposed. Second base part 213 is formed to be recessed with respect to first base part 212. Sensor board 22 is disposed in second base part 213, and first base part 212 and sensor board 22 form a base surface in which first base part 212 and sensor board 22 are flush with each other.

Figure 6:
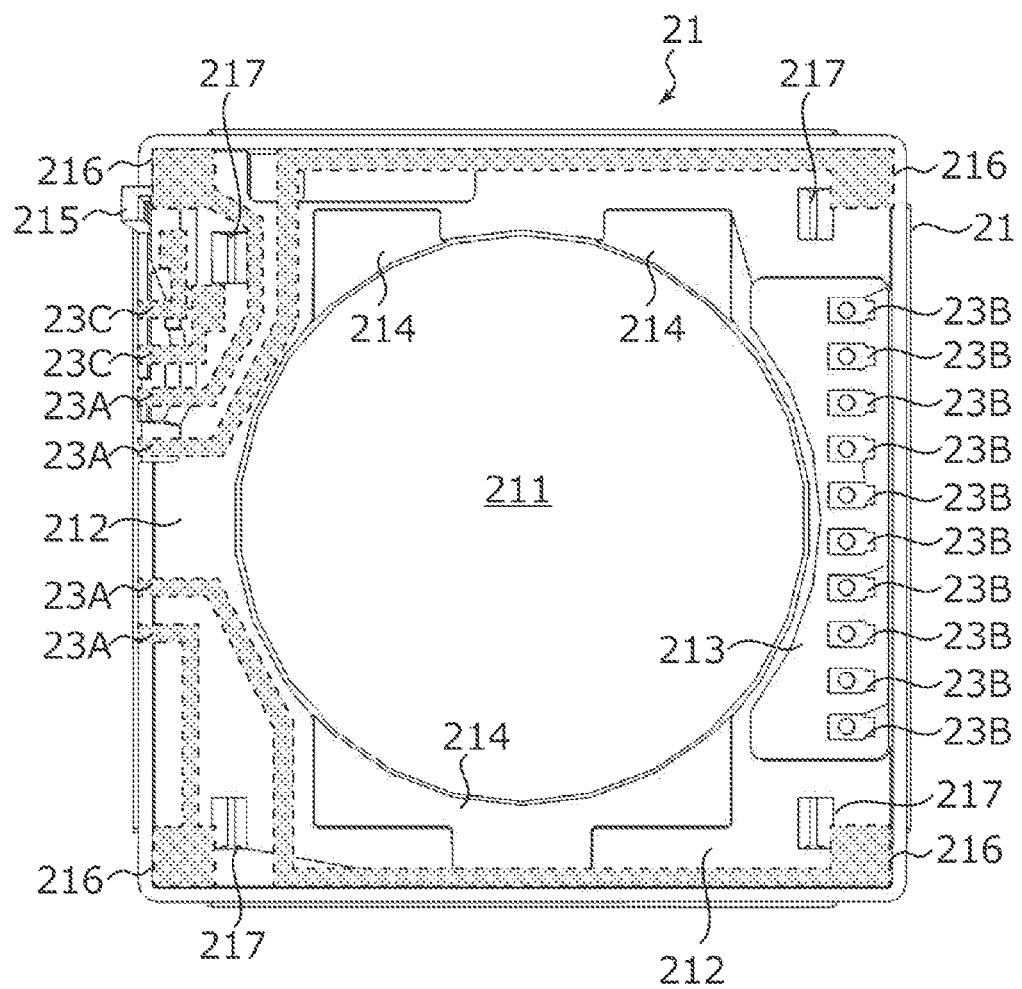
FIG. 6 is a plan view illustrating a wiring structure in a base.

In the present embodiment, second base part 213 is provided in a region in which AF driving part 14 and OIS driving part 30 are not disposed, that is, in a region corresponding to one side (fourth side) of a rectangle that is a planar shape of base 21. By disposing sensor board 22 in second base part 213 described above, power supply lines and signal lines both of which are for magnetic sensors 25X, 25Y and 25Z can be aggregated and a wiring structure in base 21 can be simplified (see FIG. 6).

Further, base 21 includes third base part 214 at peripheral edges of opening 211. Third base part 214 regulates movement of AF movable part 11 to the image formation side in the optical axis direction. Third base part 214 is formed to be recessed with respect to first base part 212 so that the movement stroke of AF movable part 11 to the image formation side in the optical axis direction is ensured.

Base 21 includes OIS motor fixing part 215 in which second OIS driving part 30Y is disposed. OIS motor fixing part 215 is provided in, for example, an angle part of base 21, is formed to protrude from first base part 212 toward the light reception side in the optical axis direction, and has a shape capable of holding second OIS driving part 30Y.

Terminal metal fittings 23A to 23C are disposed in base 21 by, for example, insert-molding. Terminal metal fittings 23A include power supply lines to AF driving part 14 and first OIS driving part 30X. For example, terminal metal fittings 23A are exposed from openings 216 formed at four corners of base 21, and are electrically connected to OIS urging members 50. Power supply to AF driving part 14 and first OIS driving part 30X is performed via OIS urging members 50. Terminal metal fittings 23B include (for example, four) power supply lines and (for example, six) signal lines both of which are for magnetic sensors 25X, 25Y, and 25Z. Terminal metal fittings 23B are electrically connected to wiring (not illustrated) formed in sensor board 22. Terminal metal fittings 23C include a power supply line to second OIS driving part 30Y.

Further, base 21 includes ball housing parts 217 in which balls 41 forming OIS support part 40 are disposed. For example, ball housing parts 217 are disposed near the four corners of base 21. Ball housing part 217 is formed to be recessed in a rectangular shape extending in the Y direction. For example, ball housing part 217 includes side surfaces formed in a tapered shape such that the groove width narrows toward a side of the bottom surface.

Sensor board 22 includes wiring (not illustrated) including power supply lines and signal lines both of which are for magnetic sensors 25X, 25Y, and 25Z. Magnetic sensors 25X, 25Y, and 25Z are mounted in sensor board 22. Magnetic sensors 25X, 25Y, and 25Z are formed of, for example, a Hall element, a tunnel magneto resistance (TMR) sensor or the like, and are electrically connected to terminal metal fittings 23B via the wiring (not illustrated) formed in sensor board 22.

Figure 10:
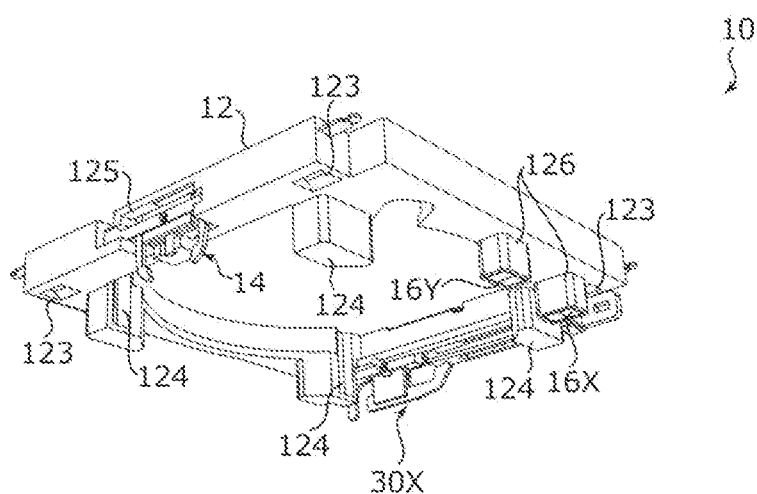
FIG. 10 is an exploded perspective view of the OIS movable part.
Figure 10:
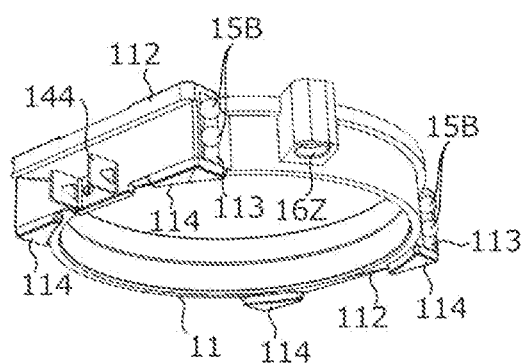
Figure 10:
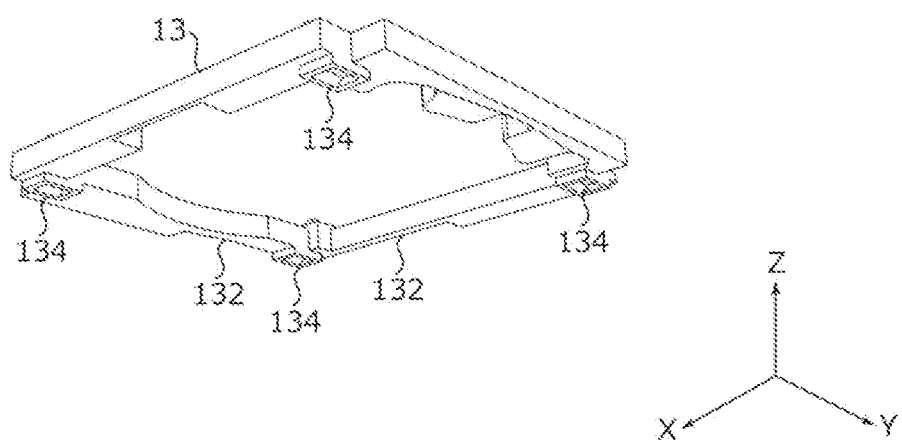

In first stage 12 of OIS movable part 10, magnets 16X and 16Y are disposed at positions facing magnetic sensors 25X and 25Y, respectively (see FIG. 10). A position detection part formed of magnetic sensors 25X and 25Y and magnets 16X and 16Y detects the position of OIS movable part 10 in the X direction and the Y direction.

Further, in AF movable part 11 of OIS movable part 10, magnet 16Z is disposed at a position facing magnetic sensor 25Z (see FIG. 10). A position detection part formed of magnetic sensor 25Z and magnet 16Z detects the position of AF movable part 11 in the Z direction. Note that, it may also be configured such that the position of OIS movable part 10 in the X direction and the Y direction and the position of AF movable part 11 in the Z direction are detected by optical sensors such as photoreflectors instead of magnets 16X, 16Y, and 16Z and magnetic sensors 25X, 25Y, and 25Z.

OIS urging member 50 is formed of, for example, a tension coil spring, and couples OIS movable part 10 to OIS fixing part 20. In the present embodiment, one ends of OIS urging members 50 are connected to terminal metal fittings 23A of base 21, and the other ends of OIS urging members 50 are connected to wirings 17A and 17B of first stage 12.

OIS urging member 50 receives a tensile load when coupling OIS movable part 10 to OIS fixing part 20, and acts so as to cause OIS movable part 10 and OIS fixing part 20 to approach each other. That is, OIS movable part 10 is held so as to be capable of swaying within the XY plane in a state of being urged in the optical axis direction (a state of being pressed against base 21) by OIS urging members 50. Thus, it is possible to hold OIS movable part 10 in a stable state without rattling.

Further, in the present embodiment, OIS urging members 50 function as power supply lines to AF driving part 14 and first OIS driving part 30X.

OIS support part 40 supports OIS movable part 10 in a state in which OIS movable part 10 is separated from OIS fixing part 20 in the optical axis direction. In the present embodiment, OIS support part 40 includes four balls 41 interposed between OIS movable part 10 (first stage 12 and second stage 13) and base 21. Four balls 41 are interposed between base 21 and second stage 13.

Figure 8:
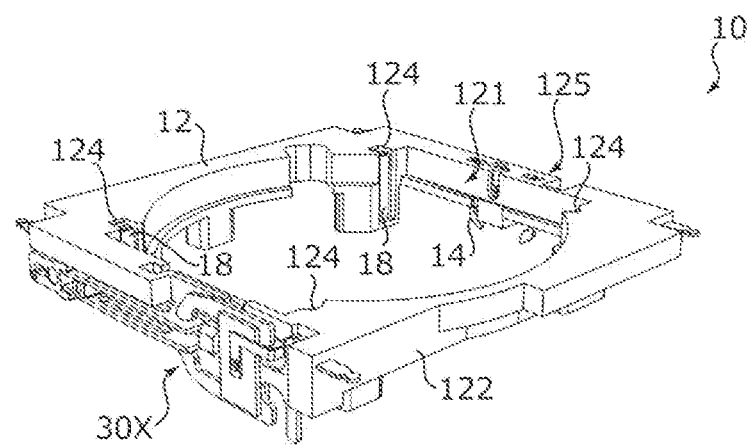
FIG. 8 is an exploded perspective view of an OIS movable part.
Figure 8:
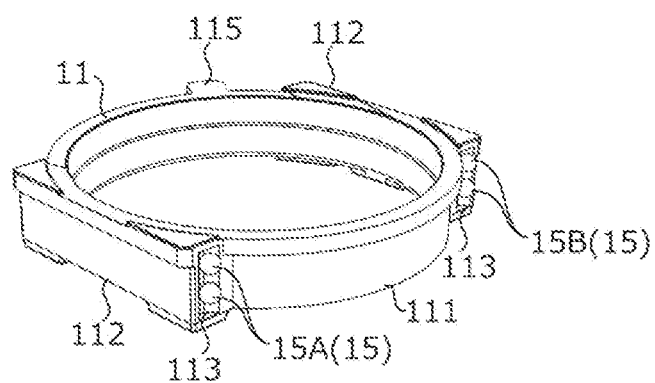
Figure 8:
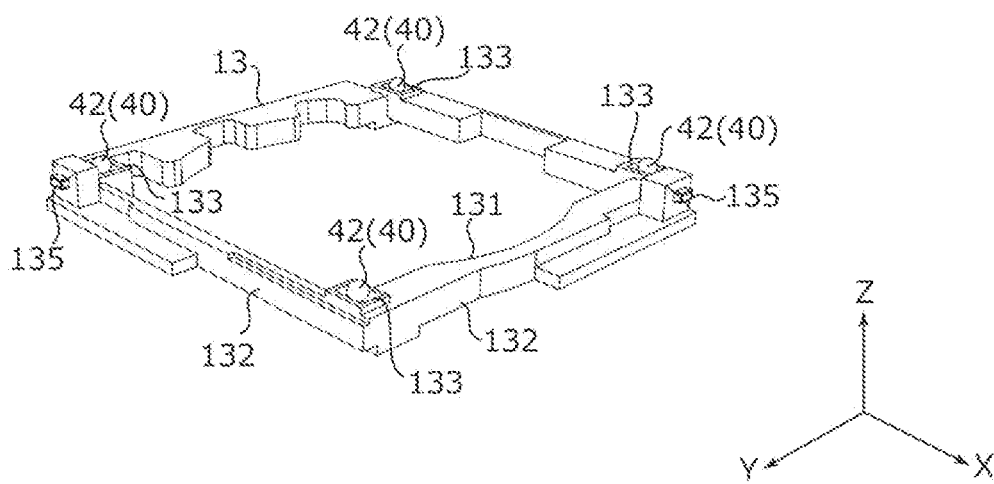

Further, OIS support part 40 includes four balls 42 interposed between first stage 12 and second stage 13 in OIS movable part 10 (see FIG. 8 or the like).

In the present embodiment, OIS movable part 10 is configured to be capable of accurately swaying within the XY plane by regulation of directions in which balls 41 and 42 (eight balls in total) forming OIS support part 40 are rollable. Note that, each number of balls 41 and 42 forming OIS support part 40 can be changed as appropriate.

OIS driving part 30 is an actuator that moves OIS movable part 10 in the X direction and the Y direction. Specifically, OIS driving part 30 is formed of first OIS driving part 30X (first XY-direction driving part) and second OIS driving part 30Y (second XY-direction driving part). First OIS driving part 30X moves OIS movable part 10 (only the AF unit) in the X direction. Second OIS driving part 30Y moves OIS movable part 10 in its entirety in the Y direction.

First OIS driving part 30X and second OIS driving part 30Y are formed of an ultrasonic motor. First OIS driving part 30X is fixed to notch 122 (OIS motor fixing part) of first stage 12 along the X direction. Second OIS driving part 30Y is fixed to OIS motor fixing part 215 of base 21 so as to extend along the Y direction. That is, first OIS driving part 30X and second OIS driving part 30Y are disposed along sides orthogonal to each other.

Figure 7A:
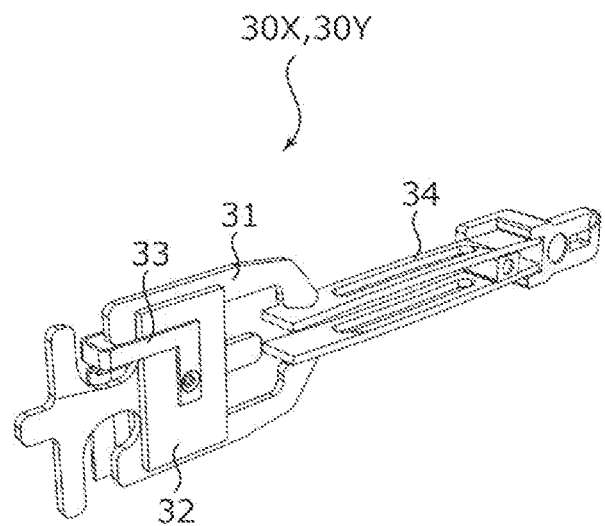
FIGS. 7A and 7B are perspective views of an OIS driving part.
Figure 7B:
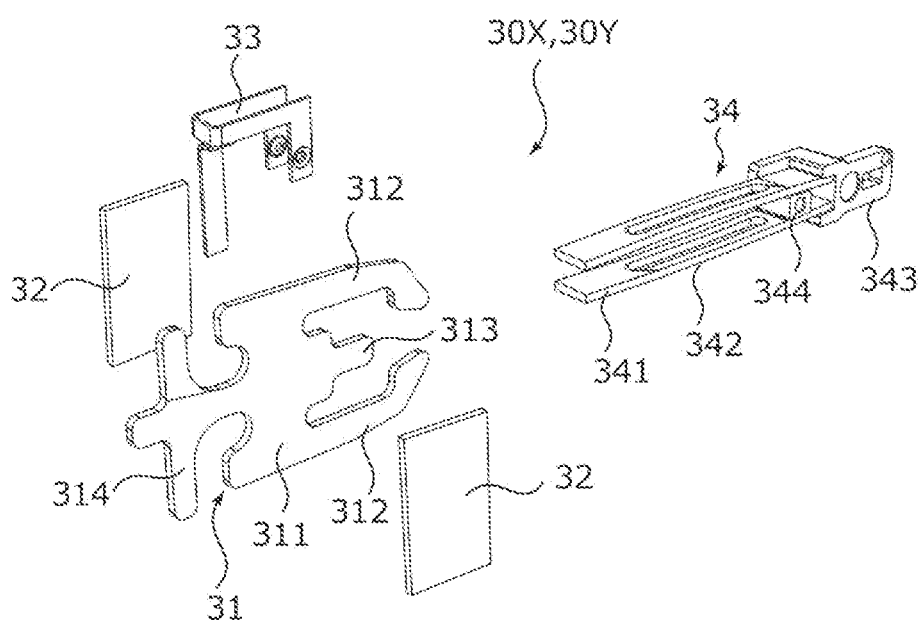

FIGS. 7A and 7B illustrate the configuration of OIS driving part 30. FIG. 7A illustrates a state in which each member of OIS driving part 30 is assembled. FIG. 7B illustrates a state in which each member of OIS driving part 30 is disassembled. Note that, FIGS. 7A and 7B illustrate second OIS driving part 30Y, but are treated as drawings illustrating OIS driving part 30 since the main configuration of first OIS driving part 30X, specifically the configuration thereof except for the shape of OIS electrode 33 is the same as that of second OIS driving part 30Y.

As illustrated in FIGS. 7A and 7B, OIS driving part 30 includes OIS resonance part 31, OIS piezoelectric elements 32, and OIS electrode 33. The driving force of OIS driving part 30 is transmitted to second stage 13 via OIS power transmission part 34. Specifically, first OIS driving part 30X is connected to second stage 13 via first OIS power transmission part 34X, and second OIS driving part 30Y is connected to second stage 13 via second OIS power transmission part 34Y.

OIS piezoelectric element 32 is, for example, a plate-like element formed of a ceramic material, and generates vibration by application of a high-frequency voltage. Two OIS piezoelectric elements 32 are disposed so as to hold trunk part 311 of OIS resonance part 31 therebetween.

OIS electrode 33 holds OIS resonance part 31 and OIS piezoelectric elements 32 from both sides, and applies a voltage to OIS piezoelectric elements 32. OIS electrode 33 of first OIS driving part 30X is electrically connected to wiring 17A of first stage 12, and OIS electrode 33 of second OIS driving part 30Y is electrically connected to wiring 23C of base 21.

OIS resonance part 31 is formed of a conductive material, and resonates with vibration of OIS piezoelectric elements 32 to convert vibration motion into linear motion. In the present embodiment, OIS resonance part 31 includes trunk part 311, two arm parts 312, protrusion part 313, and energization part 314. Trunk part 311 has a substantially rectangular shape and is held between OIS piezoelectric elements 32. Two arm parts 312 extend from upper and lower parts of trunk part 311 in the X direction or the Y direction. Protrusion part 313 extends in the X direction or the Y direction from a central part of trunk part 311. Energization part 314 extends on a side opposite to protrusion part 313 from the central part of trunk part 311. Each of two arm parts 312 has a symmetric shape, includes a free end part that abuts on OIS power transmission part 34, and symmetrically deforms when resonating with the vibration of OIS piezoelectric elements 32. Energization part 314 of first OIS driving part 30X is electrically connected to wiring 17A of first stage 12. Energization part 314 of second OIS driving part 30Y is electrically connected to wiring 23C of base 21.

Trunk part 311 of OIS resonance part 31 and OIS piezoelectric elements 32 are electrically connected to each other by bonding OIS piezoelectric elements 32 to trunk part 311 in the thickness direction and causing trunk part 311 and OIS piezoelectric elements 32 to be held from both sides by OIS electrode 33. For example, one power supply path is connected to OIS electrode 33 and another power supply path is connected to energization part 314 of OIS resonance part 31 so that a voltage is applied to OIS piezoelectric elements 32 and vibration is generated.

OIS resonance part 31 has at least two resonance frequencies, and deforms in different behaviors for each resonance frequency. In other words, the entire shape of OIS resonance part 31 is set so as to deform in different behaviors with respect to the two resonance frequencies. The different behaviors refer to behaviors of advancing and retracting OIS power transmission part 34 in the X direction or the Y direction.

OIS power transmission part 34 is a chucking guide extending in one direction, and includes one end, which is connected to OIS driving part 30, and another end, which is connected to second stage 13. OIS power transmission part 34 includes OIS motor abutment part 341, stage fixing part 343, and coupling part 342. OIS motor abutment part 341 abuts on the free end part of arm part 312 of OIS resonance part 31. Stage fixing part 343 is disposed in an end part of OIS power transmission part 34, and is fixed to OIS chucking guide fixing part 135 (see FIG. 8 or the like) of second stage 13. Coupling part 342 is a portion that couples OIS motor abutment part 341 to stage fixing part 343, and is formed to branch into two from stage fixing part 343 such that the branched portions are in parallel with each other.

The width between OIS motor abutment parts 341 is set to be wider than the width between the free end parts of arm parts 312 of OIS resonance part 31. For example, in the connection portion between coupling part 342 and stage fixing part 343, the width between OIS motor abutment parts 341 can be widened by interposing, between two coupling parts 342, separation member 344 larger than the width of the connection end part. Thus, when OIS power transmission part 34 is attached to OIS driving part 30, OIS power transmission part 34 functions as a plate spring, and an urging force acts in a direction in which arm parts 312 of OIS resonance part 31 are pushed and spread. This urging force causes OIS power transmission part 34 to be held between the free end parts of arm parts 312 of OIS resonance part 31 so that a driving force from OIS resonance part 31 is efficiently transmitted to OIS power transmission part 34.

Since OIS driving part 30 only abuts on OIS power transmission part 34 in an urged state, the movement distance (stroke) of OIS movable part 10 can be lengthened, without enlarging the outer shape of lens driving apparatus 1, only by increasing the abutment portion in the X direction or the Y direction.

First OIS driving part 30X is fixed to OIS movable part 10 (first stage 12), and is connected to second stage 13 via OIS power transmission part 34X. During shake correction in the Y direction by second OIS driving part 30Y, first OIS driving part 30X moves together with OIS movable part 10. On the other hand, second OIS driving part 30Y is fixed to OIS fixing part 20 (base 21), is connected to second stage 13 via OIS power transmission part 34Y, and is not affected by shake correction in the X direction by first OIS driving part 30X. That is, the movement of OIS movable part 10 by one of OIS driving parts 30 is not hindered by the structure of another of OIS driving parts 30. Accordingly, it is possible to prevent OIS movable part 10 from rotating around the Z axis, and it is possible to cause OIS movable part 10 to accurately sway within the XY plane.

Figure 9:
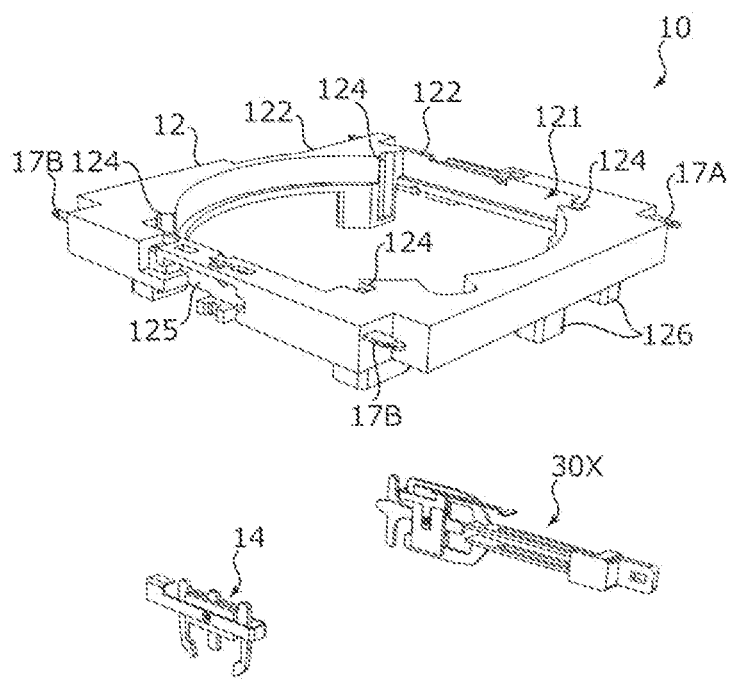
FIG. 9 is an exploded perspective view of the OIS movable part.
Figure 9:
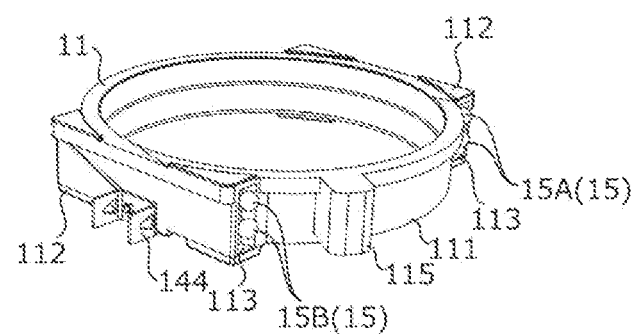
Figure 9:
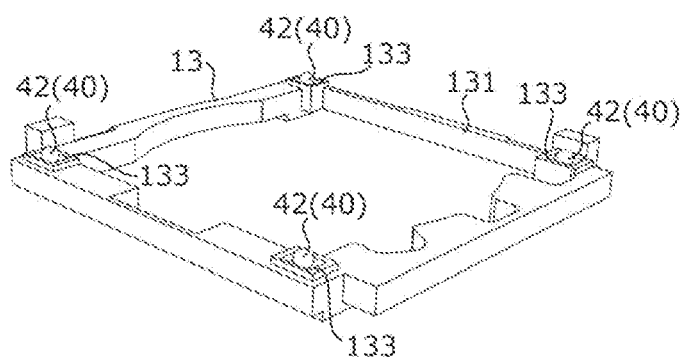

FIGS. 8 to 10 are exploded perspective views of OIS movable part 10. FIG. 9 illustrates a state in which FIG. 8 is rotated by 1800 around the Z axis. FIG. 10 is a lower perspective view illustrating a state in which FIG. 8 is rotated by 1800 around the Z axis. Note that, FIG. 9 illustrates a state in which AF driving part 14 and first OIS driving part 30X are detached from first stage 12.

Hereinafter, in a rectangle that is a planar shape of lens driving apparatus 1, a side where AF driving part 14 is disposed will be referred to as "first side", a side where first OIS driving part 30X is disposed will be referred to as "second side", a side where second OIS driving part 30Y is disposed will be referred to as "third side", and the remaining one side will be referred to as "fourth side".

As illustrated in FIGS. 8 to 10, OIS movable part 10 includes AF movable part 11, first stage 12, second stage 13, AF driving part 14, AF support part 15 and the like in the present embodiment. With respect to the movement in the Y direction, OIS movable part 10 in its entirety, including first stage 12 and second stage 13, is a movable body, whereas with respect to the movement in the X direction, second stage 13 functions as OIS fixing part 20, and only the AF unit functions as OIS movable part 10. Further, first stage 12 functions as an AF fixing part.

AF movable part 11 is a portion that moves in the optical axis direction during focusing. AF movable part 11 is disposed radially inward and separated from first stage 12 (AF fixing part), and is supported, via AF support part 15, by first stage 12 in a state in which AF movable part 11 is urged to first stage 12.

AF movable part 11 is a lens holder (hereinafter referred to as "lens holder 11") which holds lens part 2 (see FIG. 2). Lens holder 11 is formed of, for example, polyarylate (PAR), a PAR alloy obtained by mixing a plurality of resin materials including PAR, a liquid crystal polymer, or the like. Lens holder 11 includes lens housing part 111 having a tubular shape. Lens part 2 (see FIG. 2) is fixed to lens housing part 111 by, for example, adhesion.

In a peripheral surface of lens housing part 111, lens holder 11 includes ball holding parts 112 at two locations along the X direction, that is, in portions along the first side and the second side. Lens holder 11 has, for example, a cuboid shape. Each ball holding part 112 is provided with ball housing parts 113 at both end parts in the X direction. Ball housing part 113 houses AF support part 15 (ball). Ball housing part 113 includes side surfaces formed in a tapered shape such that the groove width narrows toward a side of the bottom surface. Further, the lower surface of ball holding part 112 is provided with stopper part 114 that protrudes to the image formation side in the optical axis direction from the lower surface of lens housing part 111 and regulates movement of lens holder 11 to the image formation side in the optical axis direction (lower side). In the present embodiment, stopper part 114 abuts on third base part 214 of base 21 in a reference state in which AF driving part 14 is not driven.

Further, the peripheral surface of lens housing part 111 is provided with magnet housing part 115 that houses magnet 16Z for Z-position detection. Magnet 16Z is disposed in magnet housing part 115. In sensor board 22, magnetic sensor 25Z for Z-position detection is disposed at a position facing magnet 16Z in the optical axis direction (see FIG. 4).

Figure 14:
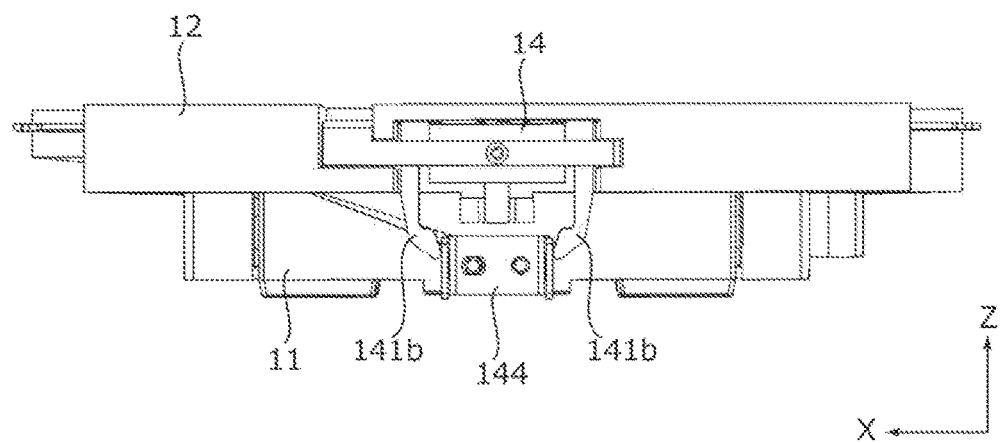
FIG. 14 is a side view illustrating an attachment state of the AF driving part.

Further, in a lower part of one of ball holding parts 112, AF power transmission part 144 is disposed so as to protrude in the Y direction (−side). AF power transmission part 144 is a chucking guide having a predetermined length in the Z direction. Arm parts 141b of AF resonance part 141 of AF driving part 14 abut on AF power transmission part 144 so as to hold AF power transmission part 144 therebetween, and power of AF driving part 14 is transmitted (see FIG. 14). Since AF power transmission part 144 is held between two arm parts 141b, a driving force generated by deformation of AF resonance part 141 is efficiently transmitted.

In the present embodiment, AF power transmission part 144 and lens holder 11 are formed of separate members. For example, AF power transmission part 144 has a U-shape in plan view, and a bottom part thereof is fixed, in a state in which side surface parts thereof face each other in the X direction, to a peripheral surface of ball holding part 112. AF power transmission part 144 is formed of, for example, a metal material such as titanium copper, nickel copper, and stainless steel. Thus, a driving force of AF driving part 14 is efficiently transmitted in comparison with a case where arm parts 141b of AF driving part 14 abut on lens holder 11 that is a resin molded product. Note that, AF power transmission part 144 may also be molded integrally with lens holder 11.

First stage 12 is a portion that supports AF movable part 11 via AF support part 15. On the image formation side in the optical axis direction of first stage 12, second stage 13 is disposed via balls 42. First stage 12 moves in the X direction and the Y direction during shake correction, and second stage 13 moves only in the Y direction during shake correction.

First stage 12 is a tubular member having a substantially rectangular shape in plan view when viewed in the optical axis direction, and is formed of, for example, a liquid crystal polymer. First stage 12 includes opening 121 in a portion corresponding to lens holder 11. Opening 121 has a substantially circular shape. It is configured such that first stage 12 is provided with notches 122 in portions corresponding to OIS driving part 30 (outer side surfaces of side walls along the second side and the third side) and OIS driving part 30 can be disposed so as not to be projected radially outward.

First stage 12 includes four ball housing parts 123 on the lower surface. Ball housing part 123 houses ball 42. Note that, in FIG. 10, one of ball housing parts 123 is not seen. Ball housing part 123 is formed to be recessed in a rectangular shape extending in the X direction. Further, ball housing part 123 includes side surfaces formed in a tapered shape such that the groove width narrows toward a side of the bottom surface. Ball housing parts 123 face ball housing parts 133 of second stage 13 in the Z direction.

In first stage 12, notches (reference sign thereof is omitted) corresponding to the shape of ball holding parts 112 of lens holder 11 are formed in the inner surfaces of two side walls along the X direction (side walls along the first side and the second side). Further, ball fixing parts 124 for fixing AF support part 15 are provided at both ends of each notch. Ball fixing part 124 is formed to protrude to the image formation side in the optical axis direction from the lower surface of first stage 12.

In first stage 12, AF motor fixing part 125 in which AF driving part 14 is disposed is formed in one side wall along the X direction (side wall along the first side). AF driving part 14 is fixed to AF motor fixing part 125 by, for example, adhesion.

In first stage 12, magnet housing part 126 for housing magnets 16X and 16Y for XY-position detection is provided in one side wall along the Y direction (side wall along the fourth side). Magnets 16X and 16Y are disposed in magnet housing part 126. For example, magnet 16X is magnetized in the X direction, and magnet 16Y is magnetized in the Y direction. In sensor board 22, magnetic sensors 25X and 25Y for XY-position detection are disposed at positions facing magnets 16X and 16Y in the optical axis direction (see FIG. 4).

Figure 12:
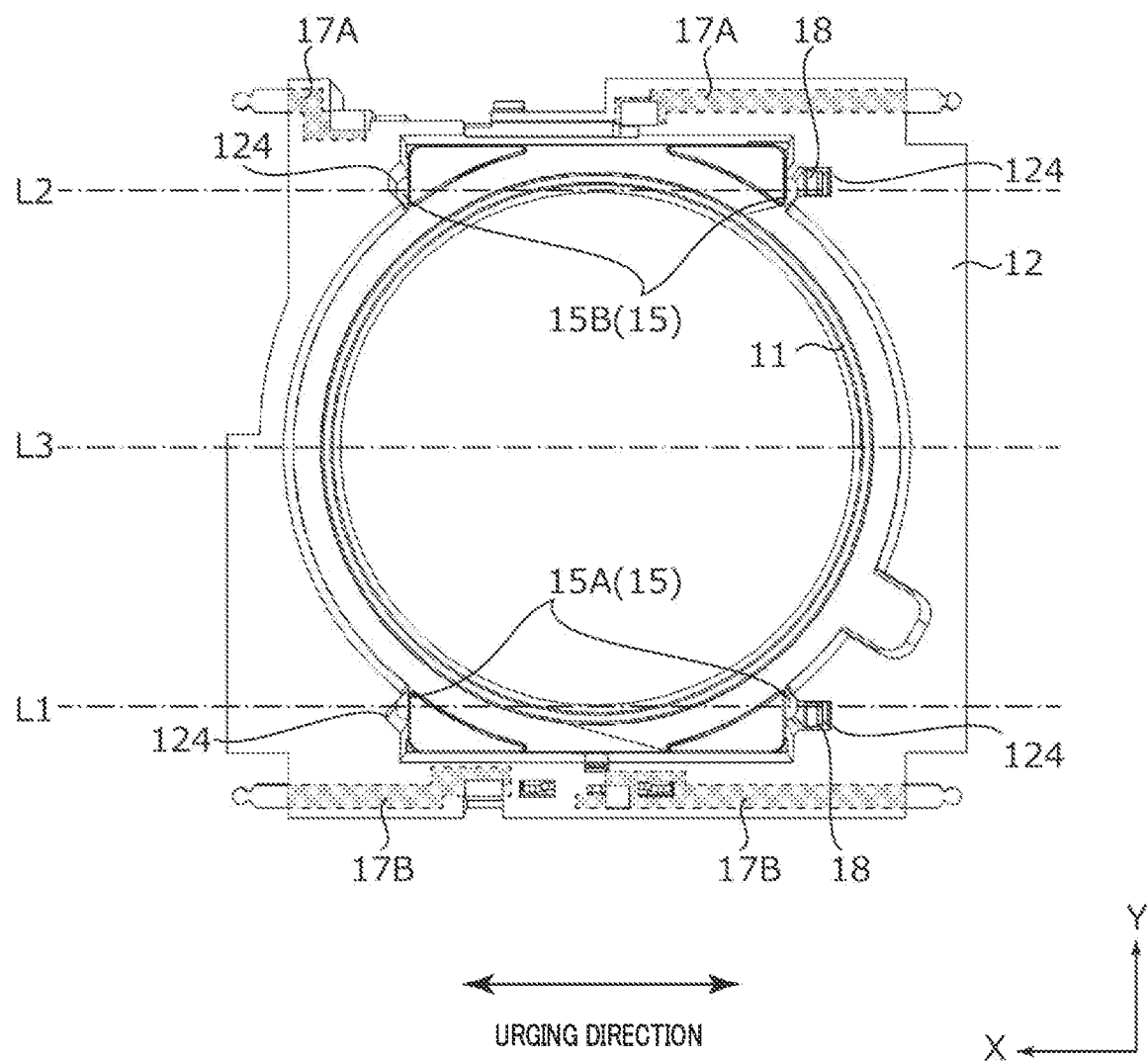
FIG. 12 is a plan view illustrating a wiring structure and a support structure in an AF unit.

Further, wirings 17A and 17B are buried in first stage 12 by, for example, insert-molding (see FIG. 12). For example, wirings 17A and 17B are disposed along the first side and the second side. Wirings 17A and 17B are exposed from four corners of first stage 12, and one ends of OIS urging members 50 are connected to the exposed portions. Power is supplied to first OIS driving part 30X via wiring 17A, and power is supplied to AF driving part 14 via wiring 17B.

Second stage 13 is a tubular member having a substantially rectangular shape in plan view when viewed in the optical axis direction, and is formed of, for example, a liquid crystal polymer. Second stage 13 includes inner peripheral surface 131 formed in accordance with the outer shape of lens holder 11. In the same manner as in first stage 12, it is configured such that second stage 13 is provided with notches 132 in portions corresponding to OIS driving part 30 (outer side surfaces of side walls along the second side and the third side) and OIS driving part 30 can be disposed so as not to be projected radially outward.

Second stage 13 includes four ball housing parts 134 on the lower surface. Ball housing part 134 houses ball 41. Ball housing parts 134 face ball housing parts 217 of base 21 in the Z direction. Ball housing part 134 is formed to be recessed in a rectangular shape extending in the Y direction. Further, ball housing part 133 includes side surfaces formed in a tapered shape such that the groove width narrows toward a side of the bottom surface.

Further, second stage 13 includes four ball housing parts 133 on the upper surface. Ball housing part 133 houses ball 42. Ball housing parts 133 face ball housing parts 123 of first stage 12 in the Z direction. Ball housing part 133 is formed to be recessed in a rectangular shape extending in the X direction. Ball housing part 123 includes side surfaces formed in a tapered shape such that the groove width narrows toward a side of the bottom surface.

Four balls 41 that form OIS support part 40 are held by multipoint contacts between ball housing parts 217 of base 21 and ball housing parts 134 of second stage 13. Accordingly, balls 41 stably roll in the X direction.

Further, four balls 42 are held by multipoint contacts between ball housing parts 133 of second stage 13 and ball housing parts 123 of first stage 12. Thus, balls 42 stably roll in the X direction.

AF support part 15 is a portion that supports lens holder 11 (AF movable part) with respect to first stage 12 (AF fixing part). In the present embodiment, AF support part 15 is formed of a plurality of (here, two) balls arranged side by side in the Z direction. AF support part 15 is interposed in a state of being rollable between ball housing part 113 of lens holder 11 and ball fixing part 124 of first stage 12.

In the present embodiment, as illustrated in FIG. 12, AF support parts 15 are disposed at four locations in an outer peripheral surface of lens holder 11. Specifically, AF support parts 15 are formed of a pair of AF support parts 15A disposed on first straight line L1 (see FIG. 12) along the X direction and a pair of AF support parts 15B disposed on second straight line L2 (see FIG. 12) along the X direction. First straight line L1 and second straight line L2 are in a symmetrical positional relationship with respect to third straight line L3 that passes through the optical axis and is parallel to the X direction.

Figure 13:
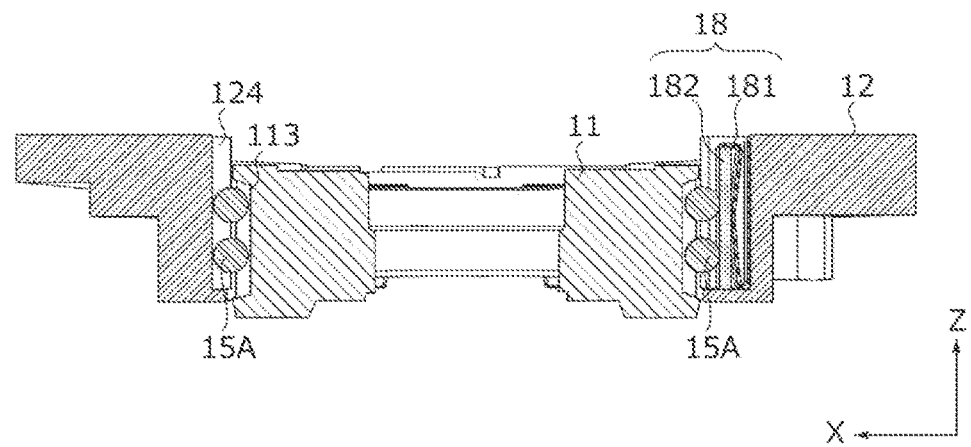
FIG. 13 illustrates the support structure in the AF unit.

Further, as illustrated in FIG. 13, urging part 18 that urges lens holder 11 is disposed between one of the pair of AF support parts 15A and ball fixing part 124 of first stage 12. FIG. 13 is a cross-sectional view taken along first straight line L1 in FIG. 12. In the same manner, urging part 18 is disposed between another pair of AF support parts 15B and ball fixing part 124 of first stage 12.

Accordingly, lens holder 11 is supported, via the pairs of AF support parts 15A and 15B, by first stage 12 in a state of being urged in the X direction. Thus, lens holder 11 is held in a stable attitude.

As illustrated in FIG. 13, urging part 18 includes, for example, plate spring 181 (urging member) formed of a metal material, and spacer 182 formed of a ceramic material (interference member) having a small coefficient of friction. Plate spring 181 is disposed on a side of first stage 12, and spacer 182 is disposed on a side of lens holder 11. By interposing spacer 182 made of ceramic between plate spring 181 and AF support part 15 (ball), it is possible to smoothly roll the ball and the durability improves. Note that, the material of spacer 182 may be a material that allow the ball to be smoothly rolled, and is not limited to a ceramic material having a small coefficient of friction, but may be, for example, a material having a moderate coefficient of friction, such as a copper alloy or stainless steel.

AF driving part 14 is an actuator that moves AF movable part 11 in the Z direction.

In the same manner as in OIS driving part 30, AF driving part 14 is formed of an ultrasonic motor. AF driving part 14 is fixed to a side wall (side wall along the first side) of first stage 12 along the X direction such that arm parts 141b extend in the Z direction.

Figure 11A:
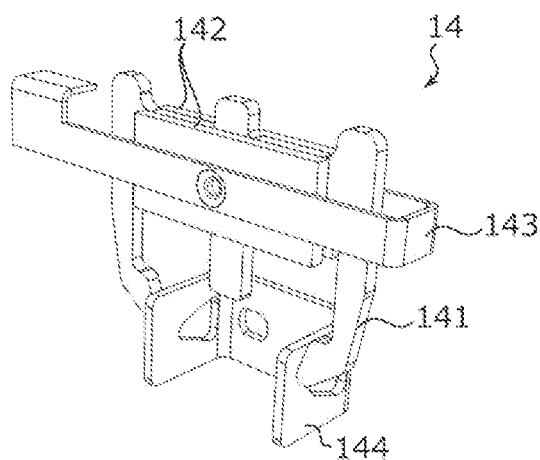
FIGS. 11A and 11B are perspective views of an AF driving part.
Figure 11B:
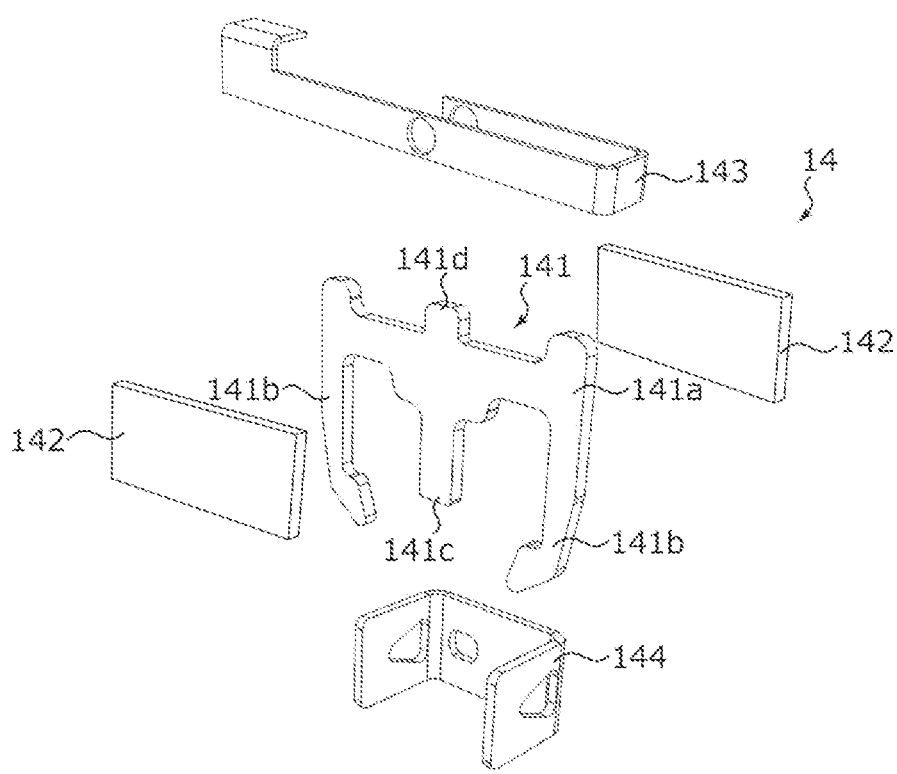

FIGS. 11A and 11B illustrate the configuration of AF driving part 14. FIG. 11A illustrates a state in which each member of AF driving part 14 is assembled. FIG. 11B illustrates a state in which each member of AF driving part 14 is disassembled. The configuration of AF driving part 14 is substantially the same as that of OIS driving part 30.

As illustrated in FIGS. 11A and 11B, AF driving part 14 includes AF resonance part 141, AF piezoelectric elements 142, and AF electrode 143. The driving force of AF driving part 14 is transmitted to lens holder 11 via AF power transmission part 144.

AF piezoelectric element 142 is, for example, a plate-like element formed of a ceramic material, and generates vibration by application of a high-frequency voltage. Two AF piezoelectric elements 142 are disposed so as to hold trunk part 141a of AF resonance part 141 therebetween.

AF electrode 143 holds AF resonance part 141 and AF piezoelectric elements 142 from both sides, and applies a voltage to AF piezoelectric elements 142.

AF resonance part 141 is formed of a conductive material, and resonates with vibration of AF piezoelectric elements 142 to convert vibration motion into linear motion. In the present embodiment, AF resonance part 141 includes trunk part 141a, two arm parts 141b, protrusion part 141c, and energization part 141d. Trunk part 141a has a substantially rectangular shape and is held between AF piezoelectric elements 142. Two arm parts 141b extend from trunk part 141a in the Z direction. Protrusion part 141c extends from a central part of trunk part 141a in the Z direction. Energization part 141d extends on a side opposite to protrusion part 141c from the central part of trunk part 141a, and is electrically connected to a power supply path (wiring 17B of first stage 12). Two arm parts 141b have a symmetric shape, and symmetrically deform when resonating with the vibration of AF piezoelectric elements 142. AF driving part 14 is disposed such that two arm parts 141b extend in the Z direction and hold AF power transmission part 144 between free end parts of two arm parts 141b.

Trunk part 141a of AF resonance part 141 and AF piezoelectric elements 142 are electrically connected to each other by bonding AF piezoelectric elements 142 to trunk part 141a in the thickness direction and causing trunk part 141a and AF piezoelectric elements 142 to be held from both sides by AF electrode 143. Energization part 141d of AF resonance part 141 and AF electrode 143 are connected to wiring 17B of first stage 12 so that a voltage is applied to AF piezoelectric elements 142 and vibration is generated.

In the same manner as in OIS resonance part 31, AF resonance part 141 has at least two resonance frequencies, and deforms in different behaviors for each resonance frequency. In other words, the entire shape of AF resonance part 141 is set so as to deform in different behaviors with respect to the two resonance frequencies.

In lens driving apparatus 1, when a voltage is applied to AF driving part 14, AF piezoelectric elements 142 vibrate, and AF resonance part 141 deforms in a behavior corresponding to the frequency. The driving force of AF driving part 14 causes AF power transmission part 144 to slide in the Z direction, which is accompanied by movement of AF movable part 11 in the Z direction and focusing. Since AF support part 15 is formed of balls, AF movable part 11 can move smoothly in the Z direction. Further, since AF driving part 14 only abuts on AF power transmission part 144 in an urged state, the movement distance (stroke) of AF movable part 11 can be easily lengthened, without impairing a reduction in the height of lens driving apparatus 1, only by increasing the abutment portion in the Z direction.

In lens driving apparatus 1, when a voltage is applied to OIS driving part 30, OIS piezoelectric elements 32 vibrate, and OIS resonance part 31 deforms in a behavior corresponding to the frequency. The driving force of OIS driving part 30 causes OIS power transmission part 34 to slide in the X direction or the Y direction, which is accompanied by movement of OIS movable part 10 in the X direction or the Y direction and shake correction. Since OIS support part 40 is formed of balls, OIS movable part 10 can move smoothly in the X direction or the Y direction.

Specifically, in a case where first OIS driving part 30X is driven and OIS power transmission part 34 moves in the X direction, power is transmitted from first stage 12, in which first OIS driving part 30X is disposed, to second stage 13. At this time, balls 41 (four balls 41 housed in ball housing parts 217) held between second stage 13 and base 21 cannot roll in the X direction so that the position of second stage 13 in the X direction with respect to base 21 is maintained. On the other hand, since balls 42 held between first stage 12 and second stage 13 can roll in the X direction, first stage 12 moves in the X direction with respect to second stage 13. That is, second stage 13 forms OIS fixing part 20, and first stage 12 forms OIS movable part 10.

Further, in a case where second OIS driving part 30Y is driven and OIS power transmission part 34 moves in the Y direction, power is transmitted from base 21, in which second OIS driving part 30Y is disposed, to second stage 13. At this time, balls 42 held between first stage 12 and second stage 13 cannot roll in the Y direction so that the position of first stage 12 in the Y direction with respect to second stage 13 is maintained. On the other hand, since balls 41 (four balls 41 housed in ball housing parts 217) held between second stage 13 and base 21 can roll in the Y direction, second stage 13 moves in the Y direction with respect to base 21. First stage 12 also follows second stage 13 to move in the Y direction. That is, base 21 forms OIS fixing part 20, and AF unit including first stage 12 and second stage 13 forms OIS movable part 10.

In this way, OIS movable part 10 sways within the XY plane and shake correction is performed. Specifically, the energizing voltage to OIS driving parts 30X and 30Y is controlled based on an angle shake-indicating detection signal from a shake detection part (for example, a gyro sensor; not illustrated) so as to offset an angle shake of camera module A. At this time, feedback on a detection result of an XY-position detection part formed of magnets 16X and 16Y and magnetic sensors 25X and 25Y makes it possible to accurately control translational movement of OIS movable part 10.

Thus, lens driving apparatus 1 according to the embodiment includes: first stage 12 (first fixing part); lens holder 11 (first movable part) disposed radially inward from first stage 12; AF support part 15 (first support part) that supports lens holder 11 with respect to first stage 12; and AF driving part 14 (Z-direction driving part) that is disposed in first stage 12 and moves lens holder 11 in the optical axis direction with respect to first stage 12. Lens driving apparatus 1 has a shape of a rectangle in plan view when viewed in the optical axis direction.

Lens holder 11 includes AF power transmission part 144 that is disposed so as to protrude radially outward. AF driving part 14 includes AF piezoelectric element 142 and AF resonance part 141, is formed of an ultrasonic motor that converts vibration motion into linear motion, and is disposed on a first side of the rectangle such that two arm parts 141*b* of AF resonance part 141 extend in the optical axis direction and hold AF power transmission part 144 therebetween.

Lens holder 11 is supported, via AF support part 15, by first stage 12 in a state in which lens holder 11 is urged in an urging direction orthogonal to the optical axis direction.

Since AF driving part 14 is formed of an ultrasonic motor, lens driving apparatus 1 makes it possible to reduce the impact of external magnetism and achieve miniaturization and a reduction in height.

Further, since arm parts 141*b* of AF driving part 14 extend in the optical axis direction and hold AF power transmission part 144 therebetween and the driving force of AF driving part 14 is maximally transmitted to lens holder 11, it is possible to efficiently obtain a driving force for moving lens holder 11. In addition, since lens holder 11 is urged to the first stage (AF fixing part) via AF support part 15, the attitude of lens holder 11 when moving in the optical axis direction is stabilized. Accordingly, the driving performance of lens driving apparatus 1 significantly improves.

Since there is no magnetic impact even when camera modules A including lens driving apparatus 1 are disposed close to each other as in smartphone M, lens driving apparatus 1 is extremely suitable for use as a dual camera.

Further, in lens driving apparatus 1, the urging direction is parallel to the first side where AF driving part 14 is disposed.

Specifically, two AF support parts 15A (first support parts) (hereinafter, may be referred to as a pair of AF support parts 15A) are disposed on first straight line L1 parallel to the urging direction in the outer peripheral surface of lens holder 11 (first movable part).

Further, plate spring 181 (urging member) is interposed between one of the pair of AF support parts 15A (first support parts) and first stage 12 (first fixing part).

Further, two AF support parts 15B (first support parts) (hereinafter, may be referred to as a pair of AF support parts 15B) are disposed on second straight line L2 parallel to the urging direction and different from first straight line L1 in the outer peripheral surface of lens holder 11 (first movable part).

Further, the pairs of AF support parts 15A and 15B (first support part) are disposed at symmetrical positions with respect to third straight line L3 being parallel to the urging direction and passing through the optical axis.

Further, AF support part 15 (first support part) is formed of balls arranged side by side in the optical axis direction.

With the above configuration, it is possible to further stabilize the attitude of lens holder 11 when moving in the optical axis direction.

While the invention made by the present inventor has been specifically described thus far based on the preferred embodiment, the present invention is not limited to the preferred embodiment described above and can be modified without departing from the gist thereof.

For example, although smartphone M that is a camera-equipped mobile terminal has been described as an example of the camera-mounted apparatus including camera module A in the preferred embodiment, the present invention is applicable to a camera-mounted apparatus that includes: a camera module; and an image-processing part that processes image information obtained by the camera module. The camera-mounted apparatus encompasses information apparatuses and transport apparatuses. The information apparatuses include, for example, camera-equipped mobile phones, notebook personal computers, tablet terminals, mobile game machines, webcams, and camera-equipped in-vehicle apparatuses (such as rear-view monitor apparatuses and dashboard camera apparatuses). Further, the transport apparatuses include, for example, automobiles.

Figure 15A:
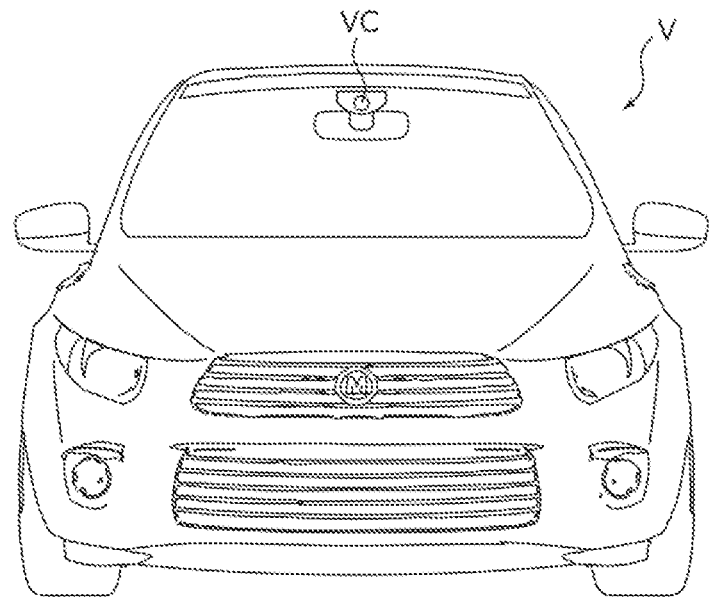
FIGS. 15A and 15B illustrate an automobile as a camera-mounted apparatus in which an in-vehicle camera module is mounted.
Figure 15B:
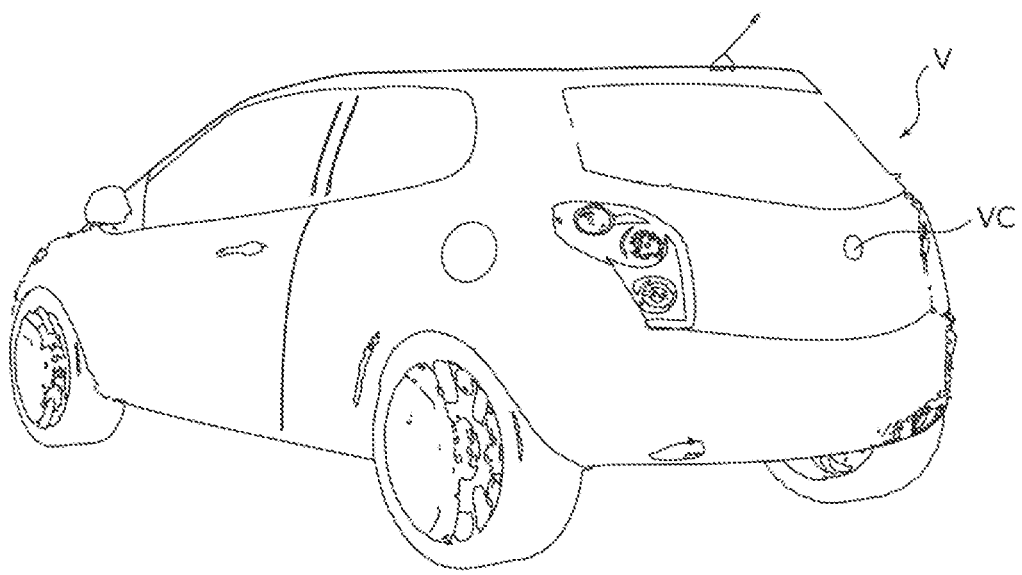

FIGS. 15A and 15B illustrate automobile V as a camera-mounted apparatus in which in-vehicle camera module vehicle camera (VC) is mounted. FIG. 15A is a front view of automobile V, and FIG. 15B is a rear perspective view of automobile V. In automobile V, camera module A described in the preferred embodiment is mounted as in-vehicle camera module VC. As illustrated in FIGS. 15A and 15B, in-vehicle camera module VC is attached to the windshield so as to face the front side, or is attached to the rear gate so as to face the rear side, for example. This in-vehicle camera module VC is used for a rear-view monitor, a dashboard camera, collision-prevention control, automated driving control, and the like.

Although lens holder 11 is urged in the X direction in the preferred embodiment, the urging direction of lens holder 11 may not be the X direction, and it is satisfactory when lens holder 11 can be held in a stable attitude. For example, in the preferred embodiment, the pairs of AF support parts 15A and 15B are disposed on straight lines L1 and L2 each of which is parallel to the X direction that is the urging direction, but the direction in which straight lines L1 and L2 extend may be the Y direction or may be a direction inclined from the X direction and the Y direction. Further, straight lines L1 and L2 may intersect each other or may not be disposed symmetrically with respect to a straight line passing through the optical axis.

In addition, the present invention is applicable not only to autofocus, but to a case where a movable part is moved in the optical axis direction, such as zoom.

Further, the support structure of the AF unit is not limited to the case where the driving source is formed of an ultrasonic motor as in AF driving part 14, but is also applicable to a lens driving apparatus including a driving source (for example, a voice coil motor (VCM)) other than an ultrasonic motor.

The embodiment disclosed herein is merely an exemplification in every respect and should not be considered as limitative. The scope of the present invention is specified not by the description provided above, but by the appended claims, and is intended to include all modifications in so far as they are within the scope of the appended claims or the equivalents thereof.

The disclosure of Japanese Patent Application No. 2019-224591, filed on Dec. 12, 2019, including the specification, drawings and abstract, is incorporated herein by reference in its entirety.

REFERENCE SIGNS LIST

1 Lens driving apparatus
10 OIS movable part (second movable part)
11 AF movable part (first movable part)
12 First stage (first fixing part)
13 Second stage
14 AF driving part (Z-direction driving part)
141 AF resonance part
142 AF piezoelectric element
143 AF electrode
144 AF power transmission part
15 AF support part (first support part)
20 OIS fixing part (second fixing part)
21 Base
30 OIS driving part (XY-direction driving part)
31 OIS resonance part
32 OIS piezoelectric element
33 OIS electrode
34 OIS power transmission part
40 OIS support part (second support part)
50 OIS urging member
A Camera module
M Smartphone (camera-mounted apparatus)

The invention claimed is:

1. A lens driving apparatus comprising:
a lens holder for holding a lens;
an ultrasonic motor configured to move the lens holder in a direction of an optical axis;
an urging part configured to urge the lens holder in an urging direction included in a direction orthogonal to the optical axis; and
a support part configured to support the lens holder in a state where the lens holder is urged in the urging direction and such that the lens holder is capable of moving in the direction of the optical axis, wherein
the support part includes two pairs of support portions which are disposed respectively on two straight lines along the urging direction and parallel to each other such that the support portions of each pair holds the lens holder therebetween, and
the urging part incudes two combinations of springs and spacers for the two airs of the support portions, and is configured to urge first support portions on one side of the two pairs toward second support portions on another side of the two pairs in the urging direction by the springs via the spacers abutting on the first support portions.

2. The lens driving apparatus according to claim 1, wherein the ultrasonic motor includes a plate-shaped resonance part disposed in parallel to one side of the lens driving apparatus, and
the urging direction is parallel to the one side.

3. The lens driving apparatus according to claim 1, wherein the two pair of support portions are disposed at symmetrical positions with respect to a straight line being parallel to the optical axis.

4. The lens driving apparatus according to claim 1, wherein each of the support portions comprises a row of balls arranged in the direction of the optical axis.

5. A camera module comprising:
a lens driving apparatus according to claim 1;
the lens; and
an image capturing part configured to capture a subject image formed by the lens.

6. A camera-mounted apparatus, which is an information apparatus or a transport apparatus, the camera-mounted apparatus comprising:
the camera module according to claim 5; and
an image processing part configured to process image information obtained by the camera module.

7. The lens driving apparatus according to claim 1, further comprising a fixing part including a tubular member which accommodates therein the lens holder such that the lens holder is capable of moving in the direction of the optical axis and which comprises an inner surface provided with a notch which accommodates therein the spring and the spacer.

\* \* \* \* \*